(12) United States Patent
Liu

(10) Patent No.: US 8,719,417 B1
(45) Date of Patent: May 6, 2014

(54) RESOURCE ALLOCATION IN DISTRIBUTED SYSTEMS

(75) Inventor: Yifang Liu, Mountain View, CA (US)

(73) Assignee: Google Inc., Mountain View, CA (US)

(*) Notice: Subject to any disclaimer, the term of this patent is extended or adjusted under 35 U.S.C. 154(b) by 51 days.

(21) Appl. No.: 13/274,067

(22) Filed: Oct. 14, 2011

(51) Int. Cl.
  *G06F 15/173* (2006.01)
  *G06F 11/00* (2006.01)

(52) U.S. Cl.
  USPC ........... 709/226; 709/201; 709/221; 709/223; 709/203; 709/220; 711/162; 711/156; 711/145; 711/141; 711/165; 714/1

(58) Field of Classification Search
  USPC .................................. 709/201, 203, 220–229
  See application file for complete search history.

(56) References Cited

U.S. PATENT DOCUMENTS

| | | | |
|---|---|---|---|
| 6,401,120 B1* | 6/2002 | Gamache et al. | 709/226 |
| 6,453,426 B1* | 9/2002 | Gamache et al. | 714/4.21 |
| 6,938,084 B2* | 8/2005 | Gamache et al. | 709/226 |
| 7,082,446 B1* | 7/2006 | Bottomley | 707/610 |
| 7,206,910 B2* | 4/2007 | Chang et al. | 711/162 |
| 7,774,469 B2* | 8/2010 | Massa et al. | 709/226 |
| 7,984,155 B2* | 7/2011 | Massa et al. | 709/226 |
| 8,112,423 B2* | 2/2012 | Bernhard et al. | 707/737 |
| 8,126,848 B2* | 2/2012 | Wagner | 707/648 |
| 2010/0161688 A1* | 6/2010 | Kesselman et al. | 707/813 |
| 2010/0250750 A1* | 9/2010 | Massa et al. | 709/226 |
| 2011/0107045 A1* | 5/2011 | Bish et al. | 711/162 |

* cited by examiner

*Primary Examiner* — Jude Jean Gilles
(74) *Attorney, Agent, or Firm* — Birch, Stewart, Kolasch & Birch, LLP

(57) ABSTRACT

This description describes technologies relating to resource allocation in distributed systems. In general, one aspect of the subject matter described in this specification can be embodied in methods that identifying a plurality of user data sets and associated properties; identifying a plurality of clusters and associated properties; identifying a distribution of replicas of the user data sets in the clusters, at least one of the clusters being assigned with two or more replicas of one of the user data sets; identifying resource allocation variables, the resource allocation variables corresponding to the distribution of replicas of the user data sets in the clusters; transforming the resource allocation variables and their relation from the distribution of replicas of the user data sets in the clusters by assigning a single replica of one of the user data sets to one of the clusters; and allocating resource using the transformed resource allocation variables.

21 Claims, 8 Drawing Sheets

RESOURCE ALLOCATION IN DISTRIBUTED SYSTEMS

FIELD OF THE INVENTION

This disclosure relates to resource allocation in distributed systems, and more particularly to methods and systems for modeling, solving, and assigning user data replica placement in a cloud computing service.

BACKGROUND

In order to support cloud computing services, various computing resources, such as processing power and storage capacity, need to be allocated to optimize latency, efficiency and load balance within the system. Furthermore, because cloud computing services often include storing and serving user data (e.g., messages, posts, pictures, videos, audio, and the like) the resource allocation often involves replicating a user's data/task into multiple copies (referred to herein as user data replicas) and placing the user data replicas in different clusters to increase/optimize service quality. Requests related to a user's data can be served from any one of the data replica based on the current state of the system. As a result, user data replication and placement can be a very efficient way to allocate system resource to improve performance, efficiency, and load balance of a cloud computer service.

However, the computational complexity of determining user data replica placement is very high, in fact the computation complexity grows exponentially with respect to the number of user data replicas per user. Accordingly, a need exists for methods to reduce the computational complexity of user data replica placement in cloud computing systems.

SUMMARY

This specification describes technologies relating to resource allocation in distributed systems, and specifically to modeling, solving, and assigning user data replica placement in a cloud computing service.

In general, one aspect of the subject matter described in this specification can be embodied in a method and apparatus for resource allocation in a distributed system comprising: identifying a plurality of user data sets and associated properties; identifying a plurality of clusters and associated properties; identifying a distribution of replicas of the user data sets in the clusters; identifying resource allocation variables, said variables corresponding to the distribution of replicas of the user data sets in the clusters; transforming the resource allocation variables and their relation from the distribution of replicas of the user data sets in the clusters by assigning a single replica of one of the user data sets to one of the clusters; and allocating resource using the transformed resource allocation variables.

These and other embodiments can optionally include one or more of the following features. One or more replica placement constraints to modify the distribution of replicas of the user data sets in the clusters are applied. A single replica of one of the user data sets is assigned to a shared-fate location that includes one or more of the clusters sharing a correlation level higher than a predetermined correlation threshold. All replicas of one of the user data sets are assigned to one or more of the clusters that are located within a predetermined region. Replicas of the user data sets are assigned such that a number of failover data set replicas of a first cluster is less than an additional capacity of a second clusters reserved for accommodating failover user data set replicas of the first cluster.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Brief explanations of some of the frequently used notations for the following detailed description are as follows:

DC—represents the set of available clusters;
BT—represents the set of user groups;
|DC|—represents the number of available clusters;
|BT|—represents the number of user groups;
$D_j$—represents the $j^{th}$ cluster;
$B_k$—represents the $k^{th}$ user group;
$|B_k|$—represents the number of users in group $B_k$;
$R_{k,i}$—represents the $i^{th}$ user data replica for users in group $B_k$;
n—represents the number of decision variables in the problem formulation;
m—represents the number of constrains in the problem formulation; and
γ—represents the number of replicas for each user according to the user view configuration.

Figure 1:
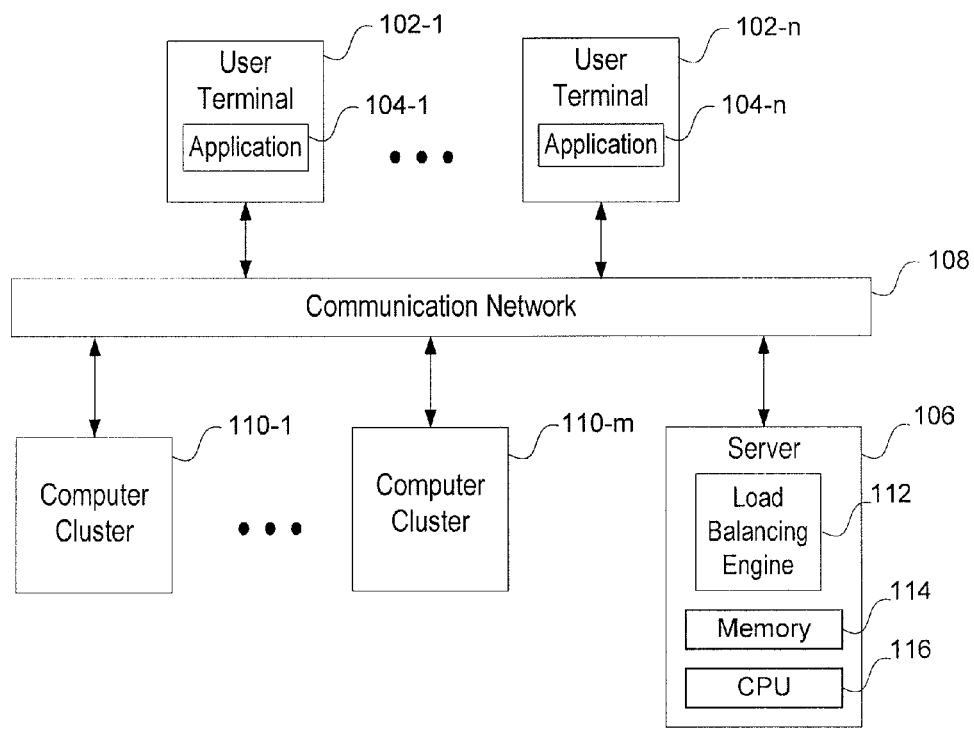
FIG. 1 is a block diagram illustrating an exemplary system for implementing resource allocation in distributed systems.

FIG. 1 illustrates a block diagram of an exemplary distributed system 100 for providing a cloud computing service. The system 100 includes a plurality of user terminals 102 (e.g., 102-1 . . . 102-n), each of which includes one or more applications 104 (e.g., 104-1 . . . 104-n), such as an internet browser. The user terminals 102 are connected to a server 106 and a plurality of computer clusters 110 (e.g., 110-1 . . . 110-m) through a network 108 such as the Internet, a local area network (LAN), wide area network (WAN), a wireless network, or a combination thereof. The server 106 may include one or more load balancing engines 112, one or more memories 114, and one or more CPUs 116.

Each of the user terminals 102 may be a computer or similar device through which a user can submit requests to and receive results or services from the server 106. Examples of the user terminals 102 include, without limitation, desktop computers, notebook computers, tablet computers, mobile devices such as mobile phones, personal digital assistants, set-top boxes, or any combination thereof.

Each of the computer clusters 110 includes one or more computers linked together by a network (not shown) such as the Internet, a local area network (LAN), wide area network (WAN), a wireless network, or a combination thereof.

Figure 2:
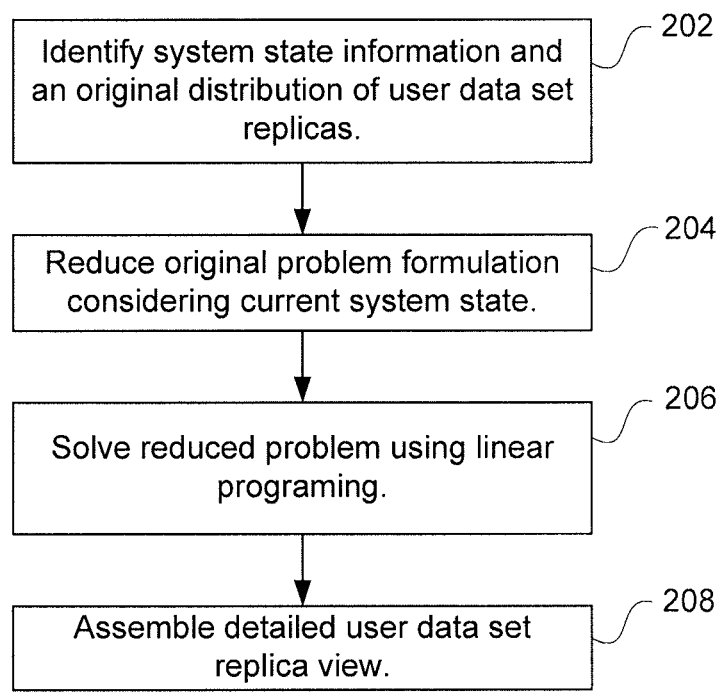
FIG. 2 is a flow diagram illustrating an exemplary process for implementing resource allocation in a distributed system.

FIG. 2 illustrates a flow diagram illustrating an exemplary process 200 for implementing resource allocation in a distributed system. In some implementations, the process 200 is performed by the server 106. System state information, which includes capacities and constraints of computer clusters, and an original distribution of user data replicas are identified (step 202), and fed to a problem order reduction process engine (step 204).

Specifically, an original problem having a high dimensionality ($W(D_{i1}, D_{i2}, D_{i3}, \ldots, B_k)$) of the original distribution of user data replicas is identified. In the original distribution of user data replicas, there may be an exponential number of possible placements of user data replicas in clusters. As a result, the computational complexity for resource allocation in the original problem grows exponentially with respect to the number of user data replicas. By processing the high dimensional original problem of the original distribution of user data replicas ($W(D_{i1}, D_{i2}, D_{i3}, \ldots, B_k)$), a reduced problem with a significantly reduced dimensionality ($X(D_j, R_{k,i})$) is obtained. The reduced problem may be implemented by linear programming (step 206) which takes the reduced (low dimensionality) problem of the original distribution of user data replicas ($X(D_j, R_{k,i})$) and solves for a new simplified (low dimensionality) user data replica distribution. The new simplified distribution of user data replicas can be considered as a simplified solution—$X'(D_j, R_{k,i})$. Furthermore, a user data replica view may be assembled based on the new simplified distribution of user data replicas (step 208). Specifically, the new simplified (low dimensionality) distribution of user data replicas ($X'(D_j, R_{k,i})$) is used to assemble a new detailed user data replica view (new high-dimensionality user data replica placements—$W'(D_{i1}, D_{i2}, D_{i3}, \ldots, B_k)$).

A major challenge in solving the resource allocation problem in large scale distributed systems is the high computational complexity due to the complex inter-user-data-replica relation/condition in the traditional problem formulation. The computational complexity, O, as a function of the number of clusters grows exponentially with respect to the number, $\gamma$, of user data replicas, $O(\#CLUSTER^{\gamma+1})$. Furthermore, the average time required to solve such a problem using, for example, linear programing, is on the order to $O(\#CLUSTER^{2(\gamma+1)})$. Accordingly, the number of variables/constraints for a conventional 5-replicas-per-user formulation would be on the order of $O(\#CLUSTER^6)$, and would take, on average, a linear programming solver on the order of $O(\#CLUSTER^{12})$ to produce a feasible solution, if there is one. Similarly, even for a 3-replica-per-user setup, the computational time would be on the order of $O(\#CLUSTER^8)$. In theory, the computational complexity would increase to at least the order of $O(\#CLUSTER^{16})$ when the maximum allowed number of replicas per user is 7. Even with a conservative #CLUSTER of 50, and a 5-replica-per-user setup, the computational complexity of the conventional method is very high. This exponential nature complexity difficulty are due to the variables setup during problem formulation.

In conventional problem formulation, variables are setup to represent the assignment of individual group of users to computer clusters combinations (e.g., master/slave pairs), which creates an inter-user-data-replica relation/condition. The users of an individual group share the same set of properties, e.g., required location, preferred location, activity levels). For example, let the variable $w(D_{j1}, D_{j2}, B_k)$ represent the number of users in group $B_k$ having their master replica in cluster $D_{j1}$ and their slave replica in cluster $D_{j2}$. In the simple master/slave setting, this variable definition produces $n\sim O(|BT||DC^2|)$ variables, where $|BT|$ represents the number of user groups and $|DC|$ represents the number of available clusters. Since $|BT|\sim O(|DC|)$, $n=O(|DC^3|)$. As such, the average computational complexity is $O(|DC^6|)$ in this case. In theory, when the number of replicas is allowed to be 7, the computational complexity for the conventional formulation is increased up to at least $O(|DC^{16}|)$.

According to an exemplary embodiment, the computation complexity of the conventional problem formulation is decreased by model order reduction. The exemplary problem formulation realizes a linear number of variables by defining the decision variables as the assignment of one user replica to one cluster, instead of the assignment of all a user's replicas to a combination of clusters, and transforming the inter-replica relation/conditions into separate-replica relation/conditions.

In an exemplary embodiment, the inter-user-data-replica combination mapping is split into individual replica-per-cluster mapping. As a result, the decision variables are simplified or reduced to $x(D_j, R_{k,i})$, which represents the number of users in group $B_k$ that have user data replica $R_i$ assigned to cluster $D_j$. This dimension reduction (determined by two-dimensional combination) increases computation efficiency, because the number of variables/constraints, n, is always $O(|DC^2|)$, regardless the number of replica-per-user.

Although this dimensionality or order reduction increases computation efficiency, the inter-replica information implicitly specified by the multi-cluster combination (i.e., inter-user data replica combination mapping) in the conventional formulation should be transformed into per-replica assignment restrictions. The inter-replica information which should be transformed includes (1) user replica shared-fate risk, (2) user replica distribution restriction, and (3) user replica coupling failover for cascading failure prevention. The proved transformations for each kind of inter-replica information are explained in the following sections.

User Data Replica Shared-fate Risk Minimization

User data replica shared-fate risk minimization provides that no two replicas for a user should be assigned to the same cluster (i.e., one user-data replica per cluster constraint). This "one user-data replica per cluster" constraint can be formulated as a hard constraint or a soft constraint with a penalty for a violation.

Lemma 1

For any specific group of users, $B_k \in BT$, the following condition is necessary and sufficient to enforce the constraint of no more than one replica of a user to be assigned to the same cluster (i.e., one-replica per cluster constraint).

$$\forall B_k \in BT, \forall D_j \in DC, \sum_{i \in \{1, \ldots, \gamma\}} x(D_j, R_{k,i}) \leq |B_k| \qquad (1)$$

For every user, $B_k$, in the set of user groups, BT, the sum of the number of user data replicas $R_{k,i}$ stored in each cluster $D_j$ must be less than or equal to the number of users in the group $|B_k|$.

Proof of Lemma 1

[Part 1]: proof of necessity: one-replica per cluster requires Equ. (1).

Proof by contradiction: Suppose that Equ. (1) does not hold and there is at least one user, $B_k$, in the set of user groups, BT, for which the sum of the number of user data replicas $R_{k,i}$ stored in a cluster $D_j$ is greater than the number of users in the group $|B_k|$, i.e., $$\exists B_k \in BT, \exists D_j \in DC, \sum_{i \in \{1,\ldots,\gamma\}} x(D_j, R_{k,i}) > |B_k|.$$

Since the number of users with the $i^{th}$ replica (every replica) in bucket $B_k$ is $$|R_{k,i}| = |B_k|, \sum_{i \in \{1,\ldots,\gamma\}} x(D_j, R_{k,i}) > |B_k|$$

indicates that there must be at least two replicas i1 and i2, such that $x(D_j, R_{k,i1}) > 0$ and $x(D_j, R_{k,i2}) > 0$.

When finding the replica combination for each of the $|B_k|$ users in bucket $B_k$ (total $|B_k|^\gamma$-replica combinations), $$\sum_{i \in \{1,\ldots,\gamma\}} x(D_j, R_{k,i}) > |B_k|$$

replicas need to be put into $|B_k|$ combinations in cluster $D_j$.

Now, according to the pigeon hole principle, there must be at least two replicas (pigeons) from cluster $D_j$ put into an identical combination (hole). That is, for some user, two of its replicas are put into the same cluster, which is against the one-replica per cluster constraint. As such, contradiction occurs. Therefore, in order to meet the one-replica constraint, Equ. (1) must hold and necessity is proven.

[Part 2]: Proof of sufficiency: Equ. (1) guarantees that the one-replica constraint is met.

Define non-empty clusters as follows: Cluster $D_j$ is non-empty, if the sum of the number of users having their replicas stored in the cluster is greater then zero, i.e., $$\sum_{i \in \{1,\ldots,\gamma\}} x(D_j, R_{k,i}) > 0.$$

Since the number of users with the $i^{th}$ replica (every replica) in bucket $B_k$ is $$|R_{k,j}| = |B_k|, \sum_{i \in \{1,\ldots,\gamma\}} x(D_j, R_{k,i}) \le |B_k|$$

in Eq. (1) indicates that the number of non-empty clusters is no less than the number of replicas $\gamma$. Let a be the number of non-empty clusters for the $\gamma$ replicas. The property above can be experessed in a matrix form as follows.

Property 1

In a cluster-replica matrix made from a feasible solution of the new linear programing model, any given set of $\gamma$ replicas spread across at least $\gamma$ non-empty cluster columns, i.e., the number of non-empty cluster rows is $\alpha \ge \gamma$ for any group of $\gamma$ replicas.

An iterative procedure (called repeated peeling procedure) is provided to generate legal replica combinations for all the users in bucket $B_k$. This procedure consists of multiple peeling iterations. Each peeling iteration carries out a reduction on the number of users in the matrix over every replica column. This reduction consists of an element in each replica column. This element represents the reduction of users for a specific replica in a specific cluster, which must be no less than the reduction of users (identical to all replica columns in this reduction). Also, any two representative elements for all the replicas can be in the same cluster row. After one peeling iteration, the matrix is updated with the reduction. Then, the next peeling iteration proceeds with the reduced matrix as the initial iteration. This peeling iteration repeats one after another until the matrix is reduced to 0.

Since in each peeling iteration, the same number of users is reduced from every replica at once, as long as Equ. (1) holds at the end of each peeling iteration, and each iteration has a non-zero reduction on the number of users over every replica, a legal replica-cluster assignment for all users in the bucket $B_k$ (one replica per cluster for a user) is proved to exist.

The condition that Equ. (1) holds at the end of each peeling iteration can be guaranteed to be met by a simple manipulation on each non-zero reduction at the end of every peeling iteration. The clusters involved in the non-zero reduction are made sure to include all "full" clusters that contain the same number of replicas as the current group size $|B_k|$. According to Property 1, the number of "full" clusters is less than or equal to the number of replicas covered. Thus, if the non-zero reduction at the end of a peeling iteration does not involve all the "full" clusters, it can be made so by replacing involved "non-full" clusters with non-involved "full" clusters, so that the non-zero reduction involves all "full" clusters, and the non-zero reduction does not break Equ. (1).

Now, it has been proved by mathematical induction that each peeling iteration has a non-zero reduction.

Any given one single replica spread across at least one cluster, according to Property 1. Thus, at least one cluster can be found to hold some of the replica of the user.

The induction step starts with assuming any given set of p replicas has a non-zero reduction. Then, the proof that any given set of p+1 replicas has a non-zero reduction is provided. In a set of p+1 replicas, pick any p replicas. Without loss of generality, let the single left out replica be the $p+1^{th}$ replica. Since any set of p replicas has a non-zero reduction, let one of its reduction be p-replica reduction. Two cases are provided.

Case 1: the $p+1^{th}$ replica column has a non-zero element outside of the p-replica reduction rows (p rows). In this case, pick one of the non-zero elements outside of the p-replica reduction rows to be the representative element for the $p+1^{th}$ replica. Putting the representative element for the $p+1^{th}$ replica together with the p-replica reduction, a non-zero p+1 replica reduction is obtained. Therefore, in this case, it has been proved that any p+1 replicas also has a non-zero reduction (p+1 rows).

Case 2: the $p+1^{th}$ replica column does not have a non-zero element outside of the p-replica reduction rows (p rows). This case means that in the p rows in the p-replica reduction, the $p+1^{th}$ replica shares at least one row with other replicas in the p replicas. Without loss of generality, let that replica be the $p^{th}$ replica.

If the $p^{th}$ replica has a non-zero element outside of the p-replica reduction (p rows), then let the $p^{th}$ replica's representative row be the $p+1^{th}$ replica's representative row, and use its non-zero element outside of the p-replica reduction as the $p^{th}$ replica's representative element. Then, this setting composes a legal p+1 replica reduction.

If the $p^{th}$ replica does not have a non-zero element outside of the p-replica reduction (p rows), the $p^{th}$, $p+1^{th}$ together with another replica (let it be the $p-1^{th}$ replica) share at least three rows in the p-replica reduction, according to Property 1 (replica p and p+1 cannot occupy two full rows in the p-replica reduction. Otherwise, it is not a p-replica reduction).

If replica p-1 has a non-zero element outside of the p-replica reduction, then let replica p's representative element be replica p+1's, and replica p−1's representative element be replica p's, and the non-zero element outside of the p-replica reduction be replica p+1's representative element. Again, the p+1 replica reduction is obtained.

If replica p−1 does not have a non-zero element outside of the p-replica reduction, then pick the p−2th replica as above, and continue the tracing as above. Eventually, within p steps, a replica having non-zero element outside of the p-replica reduction can be found, because the p rows in the p-replica reduction cannot hold p+1 entire replicas.

Therefore, in case 2, a p+1 replica reduction for any given set of p+1 replicas can always be found. Proof of the induction step is completed. This completes the proof by mathematical induction that each peeling iteration has a non-zero reduction. Thus, the proof of sufficiency is completed and sufficiency is proved.

The proved Lemma 1 provides an "if and only if" condition for the one-replica-per-cluster constraint.

Lemma 2

If the total number of replicas for the users in a group $B_k$ allocated to a cluster $D_j$ is larger than the number of users in in the group $|B_k|$, i.e., $$\sum_{i \in \{1,\ldots,\gamma\}} x(D_j, R_{k,i}) > |B_k|,$$

then the number of sharing-fate replicas, i.e., replicas that must share the same cluster $D_j$ with at least one other replica for the same user, is equal to the difference between $$\sum_{i \in \{1,\ldots,\gamma\}} x(D_j, R_{k,i}) \text{ and } |B_k|.$$

Let $z(D_j, B_k) \geq 0$ be the smallest number of extra sharing-fate replicas in cluster $D_j$ in user group $B_k$ as described above. The statement above can be expressed formally as:

$$z(D_j, B_k) = \max\left(\sum_{i \in \{1,\ldots,\gamma\}} x(D_j, R_{k,i}) - |B_k|, 0\right) \quad (2)$$

Proof of Lemma 2

Proof of Lemma 2 follows the conclusion in Lemma 1. If $$\sum_{i \in \{1,\ldots,\gamma\}} x(D_j, R_{k,i}) \leq |B_k|,$$

then according to Lemma 1, there necessarily are no replicas for users of group $B_k$ to share fate in cluster $D_j$; therefore, $z(D_j, B_k) = 0$. Otherwise, if $$\sum_{i \in \{1,\ldots,\gamma\}} x(D_j, R_{k,i}) > |B_k|$$

there must be some user data replicas for users of group $B_k$ to share fate in cluster $D_j$. In this case, when trying to assign $$\sum_{i \in \{1,\ldots,\gamma\}} x(D_j, R_{k,i})$$

user data replicas to $|B_k|$ users in cluster $D_j$, there must be at least $$\sum_{i \in \{1,\ldots,\gamma\}} x(D_j, R_{k,i}) - |B_k|$$

user data replicas to be assigned to the same user with some other replica of the user in cluster $D_j$, according to the pigeon-hole principle.

Lemma 2 provides a much simpler way to encode the penalty for violation of the one-replica-per-cluster constraint. That is, it provides a way to formulate the one-replica-per-cluster necessary and sufficient condition as either a soft or a hard constraint.

Lemmas 1 and 2 provide necessary and sufficient condition of shared-fate user data replicas on various levels of shared-fate location. For example, the shared-fate location may be a cluster, a metropolitan area hosting more than one clusters, or a network region with more than one clusters sharing high correlation in failure, power outage, network traffic condition. Expansion of Lemma 1 and 2 leads to Theorem 1, which says, the necessary and sufficient conditions of shared-fate user replicas given by Lemma 1 and 2 not only apply to cluster-level user replica assignment, but also hold generally for user replica assignment on any shared-fate location level.

Theorem 1

Let $z(A_l, B_k) \geq 0$ be the number of sharing-fate user data replicas in user group $B_k$ that must be assigned to the same shared-fate location $A_l$ with some other replica for the same user. Then $z(A_l, B_k) \geq 0$ can be expressed as:

$$z(A_l, B_k) = \max\left(\sum_{i \in \{1,\ldots,\gamma\}} \sum_{D_j \in A_l} x(D_j, R_{k,i}) - |B_k|, 0\right) \quad (3)$$

Proof of Theorem 1 is the same as the proof for Lemmas 1 and 2, by simply replacing cluster $D_j$ with region $A_l$.

Theorem 1 can be extended to variables of primary-secondary cluster pairs. Let $x(D_{j0}, D_{j1}, B_k)$ be the number of users in group $B_k$ having their primary user data replica $R_{k,i0}$ in cluster $D_{j0}$, and their secondary user data replica $R_{k,i1}$ in cluster $D_{ji}$.

Let $z(A_l, D_{j0}, B_k) \geq 0$ be the number of shared-fate secondary user data replicas (with primary user data replica in $D_{j0}$) in user group $B_k$ that must be assigned to the same shared-fate location $A_l$ with some other replicas for the same user. For paired-replica variables $x(D_{j0}, D_{ji}, R_{k,i})$, Theorem 1 holds among the secondary replicas, i.e., $$z(A_l, D_{j0}, B_k) = \max\left(\sum_{i \in \{1,\ldots,\gamma\}} \sum_{D_{ji} \in A_l} x(D_{j0}, D_{ji}, R_{k,i}) - |B_k|, 0\right) \quad (4)$$

Co-regional User Data Replica

Due to performance considerations, it can be preferred to place data replicas for a user in clusters close (in terms of network latency) to each other. This closeness is defined in terms of network regions: user data replicas in one network region have shorter network distance between them, while user data replicas across different network regions have larger network distance. A typical example of a co-region replica placement restriction is constraints on cross-continent placement of a user's replicas.

This type of inter-replica relation can be transformed into a per-replica assignment restriction based on the following constraint: There is a user replica placement solution meeting all-replica-in-one region requirement, if and only if the number of users in the every region is identical across every user replica.

According to an exemplary embodiment, this constraint is formulated in separate replica assignment to represent the cross-region and within-region user replica placement by cross-region and within-region restricted regions, respectively.

Let $x(D_j, R_{k,h,i})$ be the number of $i^{th}$ user data replicas placed in cluster $D_j$ from the group of users $B_k$, which are restricted to be placed in clusters within network region h. A network regions can be defined at different levels which a higher region composed of multiple lower regions. In some instances, network regions at the same level can overlap with each other. Given network regions of this type, when region h is a small region, $x(D_j, R_{k,h,i})$ represents within-region user data replica placement within small region h, and when region h is a bigger region containing multiple small regions, $x(D_j, R_{k,h,i})$ represents cross-region user replica data placement among the small regions in h. This relative term of $x(D_j, R_{k,h,i})$ applies to two and more than two region levels in a problem formulation. Based on this variable definition, co-region user data replica placement can be formulated as follows.

Theorem 2

The co-regional user data replica placement restriction either as a soft constraint or a hard constraint, where $x(D_j, R_{k,h,i})$, where $D_j \in Region_h$, and $$\forall B_k \in BT, \forall i \in \{1, \ldots, \gamma\}, \forall region_h \in Regions,$$

$$\sum_{D_j \in Regions_h} x(D_j, R_{k,h,i}) = |U_{k,h}|,$$

where $|U_{k,h}|$ is identical for every replica i.

If the user data replica placement is processed toward maximizing variables $x(D_j, R_{k,h,i})$ with small regions h and minimizing variables $x(D_j, R_{k,H,i})$ with large regions H (with a penalty or setting of a hard constraint $x(D_j, R_{k,H,i})=0$), the result of the process is minimized cross-region traffic (as a soft constraint) or no cross-region traffic (as a hard constraint).

User Data Replica Failover Volume Restriction

The failover cap between two computer clusters is the maximum number of users having a primary serving data replica in one computer cluster and a failover secondary data replica in the other cluster. The restriction provides that the failover volume between any two different computer clusters should not exceed the extra serving capacity of the cluster holding the primary serving data replica.

A complete failover pattern of all user data can be expressed as balancing the number of pairings between any two replicas of a user data over all user data. As such, when one or more of the computer clusters fail, the serving user data replicas and the failover secondary user data replicas can be selected to balance the load and maintain the performance of the rest of the computer clusters, without moving/coping user data around between the computer clusters.

Let $x(D_{j1}, D_{j2}, R_{k,i1}, R_{k,i2})$ be the number of user data replica pairs $(R_{k,i1}, R_{k,i2})$ placed in $(D_{j1}, D_{j2})$, respectively. The complete failover pattern of all user data can be optimized by balancing $$\sum_{B_k, (R_{k,i1}, R_{k,i2}) \in B_k} x(D_{j1}, D_{j2}, R_{k,i1}, R_{k,i2})$$

over all cluster pairs $(D_{j1}, D_{j2})$.

Figure 5:
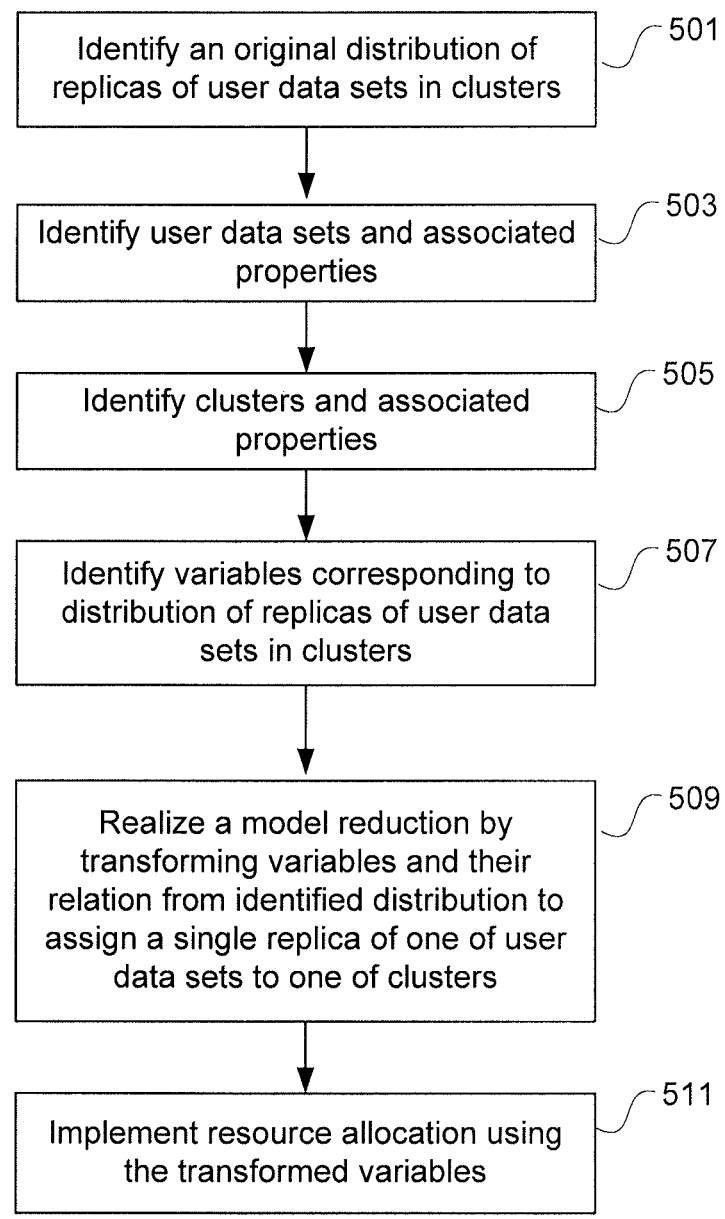
FIG. 5 is a flow diagram illustrating an exemplary process for resource allocation in a distributed system.

An exemplary process for reducing the model order of the resource application problem is illustrated in FIG. 5. The exemplary process 500 begins with identification of an original distribution of user data replicas in computer clusters 110 (step 301). The original distribution of replicas may be previously stored in the server 108 or in some other severs (not shown) in communication with the server 108. In step 503, user data sets and their associated properties are identified.

In some implementations, the associated properties include information about replica placement constraints of the user data sets. Examples of replica placement constraints are minimization of share-fate risk, communication latency constraint, and restriction of failover pattern, each of which will be explained in detail below.

In step 505, computer clusters and their associated properties are identified. In some implementations, the associated properties include information about CPU and storage capacity constraints of the computer clusters.

In some cases, the user data sets and their associated properties, and the computer clusters and their associated properties are identified based on information of the original distribution of user data replicas identified in step 501, information received from other servers (not shown) in communication with the server 106, or a combination thereof.

In step 507, high-dimensional resource allocation variables $(W(D_{i1}, D_{i2}, D_{i3}, \ldots, B_k))$ corresponding to the original distribution of replicas of the user data sets in the clusters are identified.

In step 509, the original resource allocation variables $(W(D_{i1}, D_{i2}, D_{i3}, \ldots, B_k))$ and their relation from the original distribution of replicas of the user data sets in the clusters are transformed by assigning a single replica of one of the user data sets to one of the clusters. In other words, the original (high-dimensional) resource allocation variables $(W(D_{i1}, D_{i2}, D_{i3}, \ldots, B_k))$ and their relation in an original problem are reduced into a new (low-dimensional) resource allocation variables $(X(D_j, R_{k,i}))$ and their corresponding relation.

In step 511, resources are allocated using the transformed resource allocation variables. More specifically, linear programming may be utilized by solving the transformed (low-dimensional) resource allocation variables $(X(D_j, R_{k,i}))$ to obtain a simplified solution. The simplified solution corresponds to a new simplified (low dimensionality) user data replica distribution $(X'(D_j, R_{k,i}))$. Furthermore, the new simplified (low dimensionality) distribution of user data replicas $(X'(D_j, R_{k,i}))$ may be used to assemble a new detailed user data replica view (new high-dimensionality user data replica placements—$W'(D_{i1}, D_{i2}, D_{i3}, \ldots, B_k)$). Both the linear programming process and the detailed user data replica view assembling process will be discussed in detail below.

Figure 3:
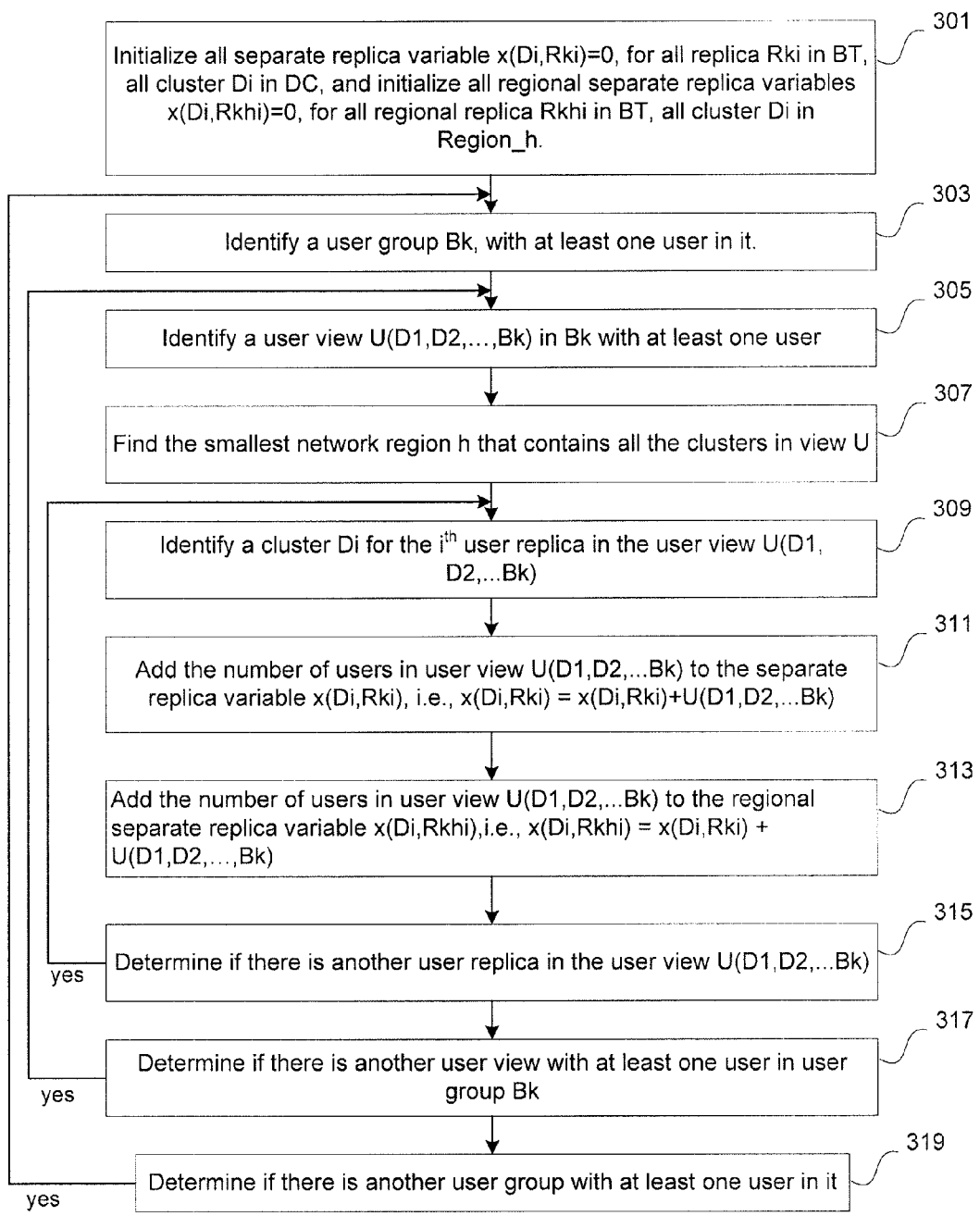
FIG. 3 is a flow diagram illustrating an exemplary process for model order reduction.

FIG. 3 illustrates a process for model order reduction. More specifically, FIG. 3 illustrates an exemplary algorithm flow for converting the decision variables corresponding to the assignment of all a user's replicas to a combination of clusters, e.g, $U(D_1, D_2, \ldots, B_k)$ to decision variables corresponding to the assignment of one user replica to one cluster, e.g., $x(D_j, R_{k,i})$. The process begins at step 301 with the initialization of all separate replica variables $x(D_j, R_{k,i})=0$, for all replica $R_{k,i}$ in BT, all clusters $D_j$ in DC and all regional separate replica variables $x(D_j, R_{k,h,i})=0$, for all replica $R_{k,h,i}$ in BT, all clusters $D_j$ in Region$_h$.

Then the process flows to steps 303 and 305 for identification of a user group $B_k$ having at least one user and at least one user view $U(D_1, D_2, \ldots, B_k)$ in the identified group. For each user view, $U(D_1, D_2, \ldots, B_k)$, in the group, the smallest network region h that contains all the clusters in the view U is found (step 307) and for each user replica in the user view U the assigned cluster $D_j$ is identified (step 309) and the number of users in user view u is added to the separate replica variable $x(D_j, R_{k,i})$ (step 311) and to the regional separate replica variable $x(D_j, R_{k,h,i})$ (step 313). Steps 303-317 are repeated until all the every view in each group is converted.

Figure 4:
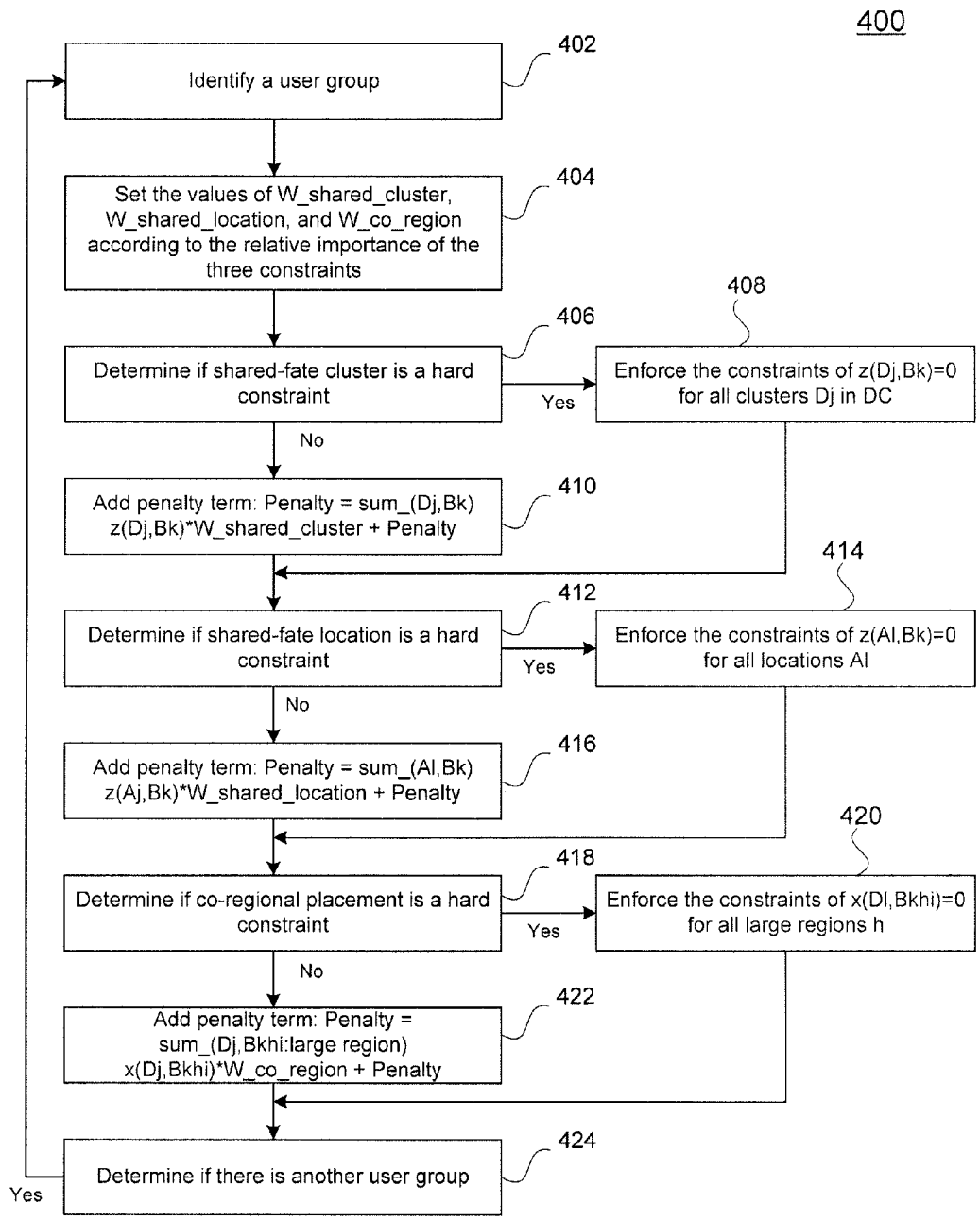
FIG. 4 is a flow diagram illustrating an exemplary process for applying hard and soft constraints corresponding to prevent loss of inter-replica information.

FIG. 4 illustrates an exemplary process for applying hard and soft constraints corresponding to prevent loss of inter-replica information. The process begins at step 402 with identification of a user group $B_k$. Because different user groups may have different relationship importance's among separate replica variables, the relation among separate replicas is preferable setup group by group. Then at step 404 the weights of the shared cluster, shared location and co-region constraints are set based on the relative importance of the three constraints. Then a determination is made at step 406 whether the shared-fate cluster constraint is a hard or soft constraint. If the shared-fate cluster constraint is a hard constraint (yes branch out of step 406), the constraint of $z(D_j, B_k)=0$ is set for all clusters $D_j$ in DC (step 406). Otherwise, a penalty term for violating the shared-fate cluster constraint is set (step 410).

Next the process flows to step 412 where a determination is made whether the shared-fate location constraint is a hard or soft constraint. If the shared-fate location constraint is a hard constraint (yes branch out of step 412), the constraint of $z(A_l, B_k)=0$ is set for all locations $A_l$ (step 414). Otherwise, a penalty term for violating the shared-fate location constraint is set (step 416). Next the process flows to step 418 where a determination is made whether the co-regional placement constraint is a hard or soft constraint. If the co-regional placement constraint is a hard constraint (yes branch out of step 418), the constraint of $x(D_j, B_{k,h,i})=0$ is set for all large regions h (step 420). Otherwise, a penalty term for violating the co-regional placement constraint is set (step 422). Steps 404-422 are then repeated for each user group.

Implementation of Reduced Problem with Linear Programming

To solve the original (high-dimensional) problem using linear programming, the number of decision variables is $n=O(|DC|^{\gamma+1})$, where $\gamma$ is the number of replicas. The exponential relation to $\gamma$ is due to the multi-cluster combination index for the variables. The number of constrains is on the same order as the number of variables, because of the delta assignment constraint in the current problem formulation, i.e., $m=O(|DC|^{\gamma+1})$. As a result, the lower bound of the average case computational complexity of the conventional linear programming formulation is $O(|DC|^{2\gamma+2})$.

In contrast, to solve the reduced problem using linear programming, the number of decision variables is $n=O(|DC|^2)$. The number of constraints is on the same order as the number of variables, i.e., $m=O(|DC|^2)$. As a result, the lower bound of the average case computational complexity of the linear programming to solve the reduced problem is $O(|DC|^4)$. So, for an average case, the improvement on computational complexity in solving the reduced problem is on the order of at least $O(|DC|^8)$.

According to an exemplary embodiment, the main process criteria considered in using linear programming to solve the reduced problem can be formulated as follows:

Constraints on a variable of aggregated user distribution:

$$\forall B_k \in BT, \forall i \in \gamma, \forall D_j \in DC, x(D_j, R_{k,i}) \geq 0$$

$$\forall B_k \in BT, \forall i \in \gamma, \sum_{D_j \in DC} x(D_j R_{k,i}) = |B_k|$$

Constraints on shared-fate user data replica placement:

$$\forall B_k \in BT, \forall i \in \gamma, \forall D_j \in DC, 0 \leq z(D_j, R_{k,i}) \leq x(D_j, R_{k,i})$$

$$\forall B_k \in BT, \forall D_j \in DC, \sum_{i \in \gamma} (x(D_j R_{k,i}) - z(D_j, R_{k,i})) \leq |B_k|$$

$$\forall B_k \in BT, \forall i \in \gamma, \forall A_l \in LOC, z(D_j, R_{k,i}) \leq z(A_l, R_{k,i}) \leq x(D_j, R_{k,i})$$

$$\forall B_k \in BT, \forall A_l \in LOC, \sum_{i \in \gamma} \left( \sum_{D_j \in A_l} x(D_j, R_{k,i}) - z(A_l, R_{k,i}) \right) \leq |B_k|$$

If shared-fate is a hard constraint, then:

$\forall B_k \in BT, \forall i \in \gamma, \forall D_j \in DC, z(D_j, R_{k,i})=0$ $\forall B_k \in BT, \forall i \in \gamma, \forall A_l \in LOC, z(A_l, R_{k,i})=0$ Otherwise, if shared-fate is a soft constraint, then put variable z as penalty term in the object function:

Minimize:

$$w_{share\_dc} \times \sum_{B_k \in BT} \sum_{i \in \lambda} \sum_{D_j \in DC} z(D_j, R_{k,i}) +$$

$$w_{share\_loc} \times \sum_{B_k \in BT} \sum_{i \in \lambda} \sum_{A_l \in LOC} z(A_l, R_{k,i})$$

where $w_{share\_dc}$ and $w_{share\_loc}$ are constant costs of placing same user's different replicas in the same cluster and location respectively.

Constraints on co-regional user data replica placement:

$$\forall B_k \in BT, \forall \text{Region}_h \in \text{Regions}, \forall i \in \gamma, \forall D_j \in DC, x(D_j, R_{k,h,i}) \geq 0$$

$$\forall B_k \in BT, \forall i \in \gamma, \sum_{\text{Region}_h \in \text{Regions}} \sum_{D_j \in \text{Region}} x(D_j, R_{k,h,i}) = |B_k|$$

$$\forall B_k \in BT, \forall i \in \gamma, \forall \text{Region}_h \in \text{Regions} \sum_{D_j \in \text{Region}_h} x(D_j, R_{k,h,i}) = |U_{k,h}|$$

$$\forall B_k \in BT, \forall i \in \gamma, \forall \text{Region}_h \in \text{Regions} \sum_{D_j \notin \text{Region}_h} x(D_j, R_{k,h,i}) = 0$$

If co-regional is a hard constraint, i.e., all users must have their data replicas placed in the smallest level_0 region (regions become larger in the order of level 0, 1, 2, 3 . . . ), then: $\forall B_k \in BT, \forall i \in \gamma, \forall \text{Region}_h > \text{Regions}_{level0}, \forall D_j \in DC, x(D_j, R_{k,h,i})=0$ Otherwise, if co-regional is a soft constraint, then put variable $x(D_j, R_{k,h,i})$ with large regions as penalty terms in the objective function:

Minimize:

$$\sum_{Regions_h \in Regions} W_{Regions_h} \times \sum_{B_k \in BT} \sum_{i \in \{1,...,\gamma\}} \sum_{D_j \in Region_h} x(D_j, R_{k,h,i})$$

where $W_{Region_h}$ is the constant cost of placing same user's different data replicas in Region h.

Inter-cluster failover cap is set to prevent some cluster to be overloaded by the user service load failed over from the other cluster, which may just become out of service. The failover cap basically states that the number of users having primary service replica in cluster A and secondary serving replica in cluster B should not exceed certain percentage (θ) of the maximum number of users able to be served in cluster B. This way, when a cluster is down, other clusters will not suddenly be overwhelmed by the user service shifted over from the failed cluster.

Constraint on inter-cluster failover cap can be formulated as:

$\forall D_{j0} \in DC, \forall D_{ji} \in DC, D_{j0} \neq D_{j1}$, $$\sum_{B_k \in BT} x(D_{j0}, D_{j1}, R_{k,1}) \leq \theta\% \times ClusterCapacity_{j1},$$

where $x(D_{j0}, D_{j1}, R_{k,1})$ denotes the number of users having its primary serving user replica in $D_{j0}$ and secondary serving user replica $R_{k,1}$ in $D_{j1}$.

User replica placement restriction is set for some special needs of inter-user clustering. It basically says that for a special group of users $B_k$ all of their $i^{th}$ user replicas $R_{k,i}$ have to be placed in the same cluster. The choice of the cluster for the restricted user replicas of this user group can be any cluster.

Constraint on the restricted replica placement can be formulated as:
For a user group $B_k$ subject to replica placement restriction on replica i, $\forall D_{j1} \in DC, \forall D_{j2} \in DC, D_{j1} \neq D_{j2}, q(D_{j1}, D_{j2}, R_{k,i}) \geq 0$.

$\forall D_{j1} \in DC, \forall D_{j2} \in DC, D_{j1} \neq D_{j2}$, $q(D_{j1}, D_{j2}, R_{k,i}) \geq x(D_{j1}, R_{k,i}) - x(D_{j2}, R_{k,i})\ldots$ $$\sum_{D_{j1} \in DC, D_{j2} \in DC, D_{j1} \neq D_{j2}} q(D_{J1}, D_{j2}, R_{k,i}) = |B_k|(\gamma - 1).$$

Minimize:

$$\sum_{D_{j1} \in DC, D_{j2} \in DC, D_{j1} \neq D_{j2}} W_{placement\_restriction} q(D_{J1}, D_{j2}, R_{k,i})$$

Figure 6:
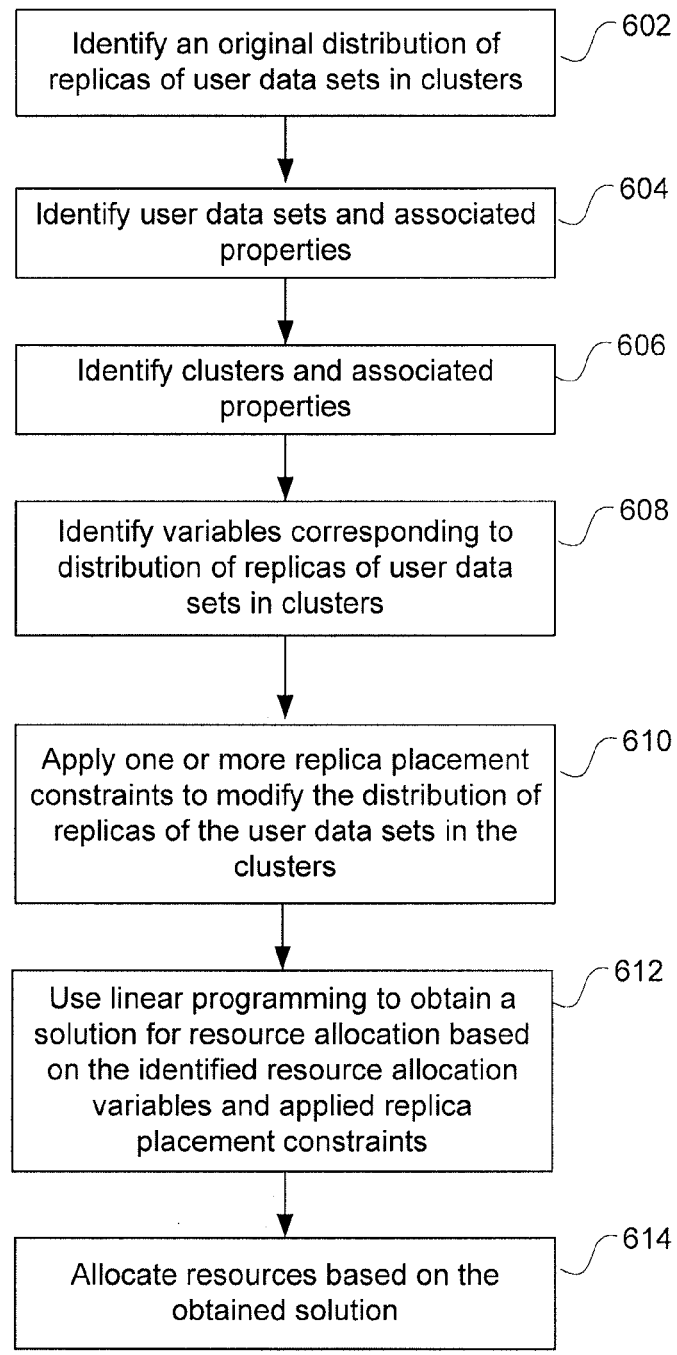
FIG. 6 is a flow diagram illustrating an exemplary process for resource allocation using linear programing.

FIG. 6 illustrates an exemplary process for resource allocation using linear programing. The exemplary process 600 begins with identification of an original distribution of user data replicas in computer clusters 110 (step 602). The original distribution of replicas may be previously stored in the server 108 or in some other severs (not shown) in communication with the server 108. In step 604, user data sets and their associated properties are identified.

In some implementations, the associated properties include information about replica placement constraints of the user data sets. Examples of replica placement constraints are minimization of share-fate risk, communication latency constraint, and restriction of failover pattern, as discussed above. In step 606, computer clusters and their associated properties are identified. In some implementations, the associated properties include information about CPU and storage capacity constraints of the computer clusters.

In some cases, the user data sets and their associated properties, and the computer clusters and their associated properties are identified based on information of the original distribution of user data replicas identified in step 602, information received from other servers (not shown) in communication with the server 106, or a combination thereof.

In step 608, resource allocation variables, e.g., $W(D_{i1}, D_{i2}, D_{i3}, \ldots, B_k)$, corresponding to a distribution of replicas of the user data sets in the clusters are identified. Then one more replica placement constraints are applied to modify the distribution of replicas of the user data sets in the clusters (step 610). As discussed above, the replica placement constraints can be applied as hard or soft constraints.

In step 612 linear programming is utilized to obtain a solution for resource allocation based on the identified resource allocation variables and applied replica placement constraints. Finally, resources are allocated based on the obtained solution (step 614).

The model order reduction process provides tremendous speedup of the resource allocation runtime. In some cases, the resource allocation runtime may speed up more than 100 times by linear programming implementation of the reduced problem. Because of the complexity posed by multiple user data replicas for one user and the exponential number of possible placements of these user data replicas, the problem space is huge, and thus the runtime of conventional solver for the problem is very long. The result is significantly reduced solver runtime. Because of the linear relation (instead of exponential relation) between the number of variables in the solver and the maximum number of data replicas for one user, the solver runtime speedup is particularly large, when the maximum number of data replicas for one user is high.

Furthermore, a resource allocation solution implemented by embodiments of the invention greatly improves efficiency because much less moving/copying user data replicas between clusters to achieve the resource allocation would be required. In some cases, modeling equivalent data placements according to the invention provides saving on user data moves can be more than 99%, compared to a conventional resource allocation.

By more accurately modeling the user data move/copy, the data move/copy cost can be further reduced. For example, the data move/copy cost can be taken into account by flipping two user data replicas' placements (the clusters they are placed into).

Furthermore, performing resource allocation for more system states (including abnormal or faulty system states) can improve resource allocation.

Also, exemplary embodiments provide more responsive reaction to system state change by the two layer process (static process, dynamic process), compared to conventional resource allocation methods, and maintain system availability and performance by adapting fast (without moving/copying user data between clusters) to sharp system state changes.

User Data Replica View Assembling

A user data replica view is a list of clusters in which a user's replicas are allocated. The user data replica view is assembled by assigning new user data replica views to every group of users (while maintaining the satisfaction of shared-fate constraint), given the new replica distribution, $x(D_j, R_{k,i})$, of all user groups.

Two critical concepts/operations: (1) detect topoff clusters and locations in current user replica distribution for a user group; and (2) detect the exceeding of shared-fate budget in a user replica view.

A topoff cluster or location is a cluster or location that has the total number of user replicas in a user group larger than or equal to the current number of unassigned users in the user groups.

A topoff cluster $D_j$ satisfies the following condition:

$$\sum_{i \in \gamma} x(D_j, R_{k,i}) \geq |B_k|.$$

A topoff location $A_l$ satisfies the following condition:

$$\sum_{D_j \in A_l} \sum_{i \in \gamma} x(D_j, R_{k,i}) \geq |B_k|.$$

Figure 7:
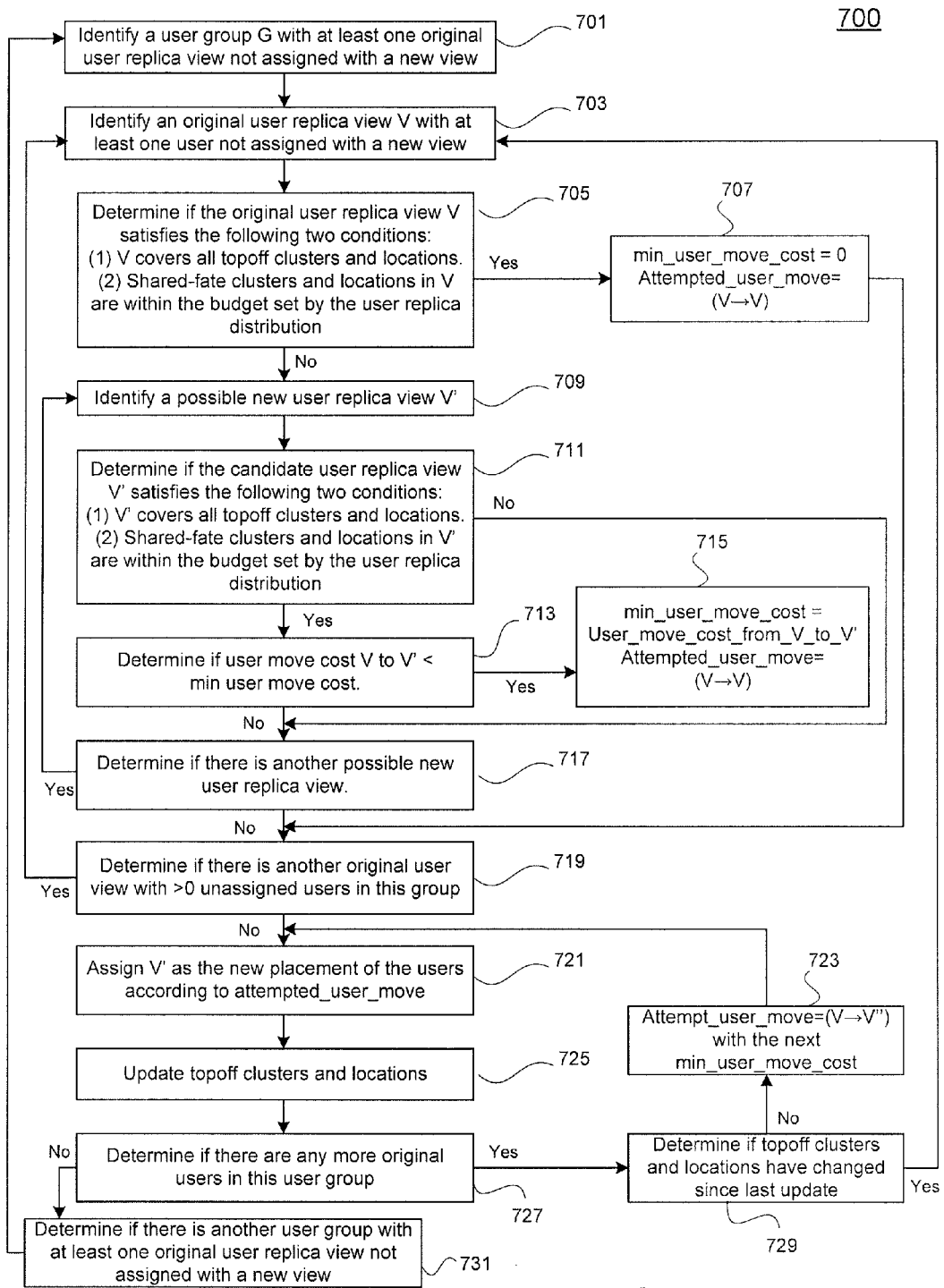
FIG. 7 is a flow diagram illustrating an exemplary process for assembling user data replica views.

An exemplary process 700 for assembling user data replica views is illustrated in FIG. 7. In some implementations, the process 700 is performed by the server 106. The process begins with the initialization of variables (not shown). In step 701, a user group having at least one original user replica view not assigned with a new view is identified. Then, in step 703, one of the user replica views is identified.

For each identified original user replica view, it is determined whether the view covers all topoff clusters and locations and whether the shared-fate clusters and location in the view V are within the budget set by the user replica distribution (step 705). If both conditions are met (yes branch out of step 705), then the variable min_user_move_cost, which tracks the minimum cost to move from V to V, i.e., zero and variable attempted_user_move, which tracks the user data replica view to be used as the new user data replica view, is set to the current view (step 707). Processing then proceeds to the next identified original user replica view, if any (step 719).

Otherwise (no branch out of step 705) the process proceeds to step 709, where a possible new user replica view V' is identified. In step 711, it is determined whether the possible user data replica view V' covers all topoff clusters and locations and whether the shared-fate clusters and location in the view V' are within the budget set by the user replica distribution. If the possible user data replica view V' satisfies both conditions, the process proceeds to step 713. Otherwise, the process proceeds to step 717 to determine if there is another possible new user replica view.

In step 713, the user move cost for changing the original user data replica view V to the possible user data replica view V' is calculated. If the user move cost is less than the minimum user move cost, the variable attempted_user_replica_view is set to equal to the candidate user data replica view V' and the minimum user move cost is set equal to the user move cost for changing the original user data replica view V to the candidate user data replica V' (step 715). Then the process proceeds to step 717 where steps 709 through 715 are repeated until there are no more possible new user data replica views. When there are no more possible new user replica views the process proceeds to step 719, where steps 703 through 717 are repeated until there are no more original user replica views identified for the group.

In step 721, V' is assigned as the new placement of the users according to the variable attempted_user_move. Then the sets of topoff clusters and locations are updated at step 725. In step 727, it is determined whether there are any more original users in this user group. If there are additional original users (yes branch out of step 727) it is determined whether the topoff clusters and locations have changed since the last update (step 729). If there has been a change, the process returns back to step 703. Otherwise the process proceeds to step 723 where the attempt_user_move is set to move original user replica view V to V' with the next_user_move_cost and the process proceeds back to step 721.

It there are no more original users in the group (no branch out of step 727), then a determination of as to whether another user group having at least one original user replica view not assigned with a new view at step 731. If another user group exists the process proceeds back to step 701. Otherwise, the process ends.

Figure 8:
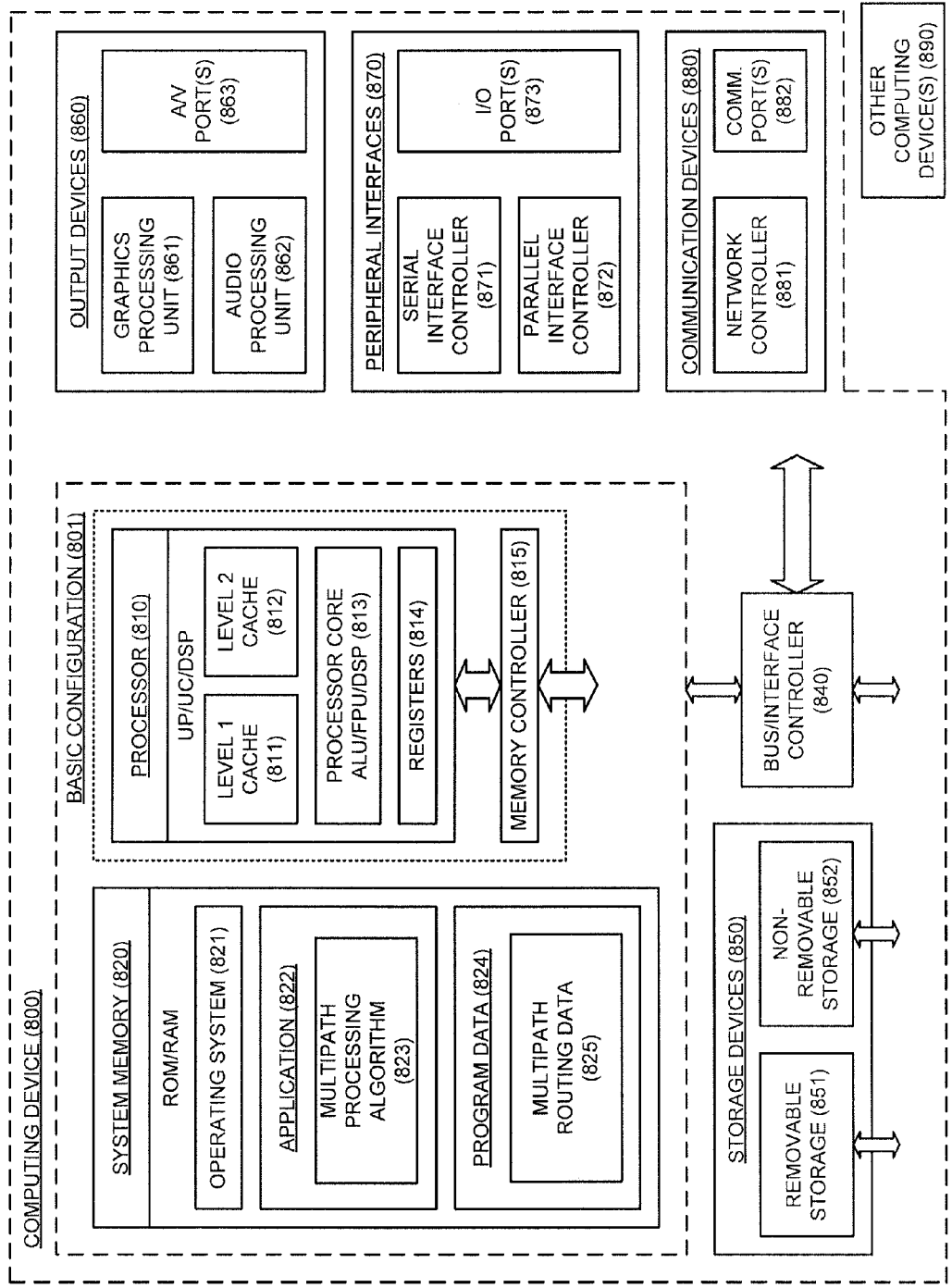
FIG. 8 is a block diagram illustrating an example of a computing device for implementing resource allocation in distributed systems.

FIG. 8 is a block diagram illustrating an example computing device 800 that is arranged for implementing resource allocation in distributed systems in accordance with the present disclosure. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (μP), a microcontroller (μC), a digital signal processor (DSP), or any combination thereof. Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes resource allocation algorithm 823 that is arranged to perform resource allocation in a distributed systems. Program Data 824 includes resource allocation data 825 that is useful for performing resource allocation in distributed systems, as will be further described below. In some embodiments, application 822 can be arranged to operate with program data 824 on an operating system 821 such that resource allocation in distributed systems is performed. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output devices 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication device 880 includes a network controller 881, which can be arranged to facilitate communications with one or more other computing devices 890 over a network communication via one or more communication ports 882. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer implemented method for resource allocation in distributed system, the method comprising:
    identifying a plurality of user data sets and associated properties;
    identifying a plurality of clusters and associated properties;
    identifying a distribution of replicas of the user data sets in the clusters;
    identifying resource allocation variables, said variables corresponding to the distribution of replicas of the user data sets in the clusters, distributing at least one user's user data set to clusters by defining decision variables as assignments of a plurality of the user's user data replicas to a combination of clusters and specifying inter-replica relations and conditions;
    modifying the resource allocation variables by redefining the decision variables as assignments restricted by a one-user replica-per-user-per-cluster constraint and transforming the inter-replica relations and conditions into separate replica relations and conditions based on the one-user replica-per-user-per-cluster constraint; and
    allocating a resource using the modified resource allocation variables.

2. The method of claim 1, wherein the associated properties of the clusters include capabilities and limitations of the plurality of clusters.

3. The method of claim 1, further comprising:
    applying one or more replica placement constraints to modify the distribution of replicas of the user data sets in the clusters.

4. The method of claim 3, said applying step assigning a single replica of one of the user data sets to a shared-fate location that includes one or more of the clusters sharing a correlation level higher than a predetermined correlation threshold.

5. The method of claim 3, said applying step assigning all replicas of one of the user data sets to one or more of the clusters that are located within a predetermined region.

6. The method of claim 3, said applying step assigning replicas of the user data sets such that a number of failover data set replicas of a first cluster is less than an additional capacity of a second clusters reserved for accommodating failover user data set replicas of the first cluster.

7. The method of claim 1, further comprising:
    identifying one user data set including at least one original user data replica views from the user data sets; and
    for the at least one original user data replica view:
        determining a new user data replica view and a moving cost for changing the original user data replica view with the determined new user data replica view; and
        changing the original user data replica view to the determined new user data replica view if the moving cost is equal to a minimum value.

8. An apparatus for implementing resource allocation in distributed system, comprising:
    one or more processors;
    a memory; and
    one or more programs stored in the memory and configured for execution by the one or more processors to perform the following steps:
        identifying a plurality of user data sets and associated properties;
        identifying a plurality of clusters and associated properties;
        identifying a distribution of replicas of the user data sets in the clusters;
        identifying resource allocation variables, said variables corresponding to the distribution of replicas of the user data sets in the clusters, distributing at least one user's user data set replicas to clusters by defining decision variables as assignments of a plurality of the user's user data replicas to a combination of clusters and specifying inter-replica relations and conditions;
        modifying the resource allocation variables by redefining the decision variables as assignments restricted by a one-user replica-per-user-per-cluster constraint and transforming the inter-replica relations and conditions into separate replica relations and conditions based on the one-user replica-per-user-per-cluster constraint; and
        allocating a resource using the modified resource allocation variables.

9. The apparatus of claim 8, wherein the associated properties of the clusters include capabilities and limitations of the plurality of clusters.

10. The apparatus of claim 8, said one or more programs being further configured for execution by the one or more processors to perform the step of:
    applying one or more replica placement constraints to modify the distribution of replicas of the user data sets in the clusters.

11. The apparatus of claim 10, said step of applying assigning a single replica of one of the user data sets to a shared-fate location that includes one or more of the clusters sharing a correlation level higher than a predetermined correlation threshold.

12. The apparatus of claim 10, said step of applying assigning all replicas of one of the user data sets to one or more of the clusters that are located within a predetermined region.

13. The apparatus of claim 10, said step of applying assigning replicas of the user data sets such that a number of failover data set replicas of a first cluster is less than an additional capacity of a second clusters reserved for accommodating failover user data set replicas of the first cluster.

14. The apparatus of claim 8, said one or more programs being further configured for execution by the one or more processors to perform the steps of:
    identifying one user data set including at least one original user data replica views from the user data sets; and
    for the at least one original user data replica view:
        determine a new user data replica view and a moving cost for changing the original user data replica view with the determined new user data replica view; and
        changing the original user data replica view to the determined new user data replica view if the moving cost is equal to a minimum value.

15. A non-transitory computer readable medium having computer-executable instructions, which, when executed by a computer having one or more processors, cause the computer to perform steps of:
- identifying a plurality of user data sets and associated properties;
- identifying a plurality of clusters and associated properties;
- identifying a distribution of replicas of the user data sets in the clusters;
- identifying resource allocation variables, said variables corresponding to the distribution of replicas of the user data sets in the clusters, distributing at least one user's user data set replicas to clusters by defining decision variables as assignments of a plurality of the user's user data replicas to a combination of clusters and specifying inter-replica relations and conditions;
- modifying the resource allocation by redefining the decision variables as assignments restricted by a one-user replica-per-user-per-cluster constraint and transforming the inter-replica relations and conditions into separate replica relations and conditions based on the one-user replica-per-user-per-cluster constraint; and
- allocating a resource using the modified resource allocation variables.

16. The non-transitory computer readable medium of claim 15, wherein the associated properties of the clusters include capabilities and limitations of the plurality of clusters.

17. The non-transitory computer readable medium of claim 15, said computer-executed instructions, which, when executed by the computer, causing the computer to perform additional step of:
- applying one or more replica placement constraints to modify the distribution of replicas of the user data sets in the clusters.

18. The non-transitory computer readable medium of claim 17, the step of applying assigning a single replica of one of the user data sets to a shared-fate location that includes one or more of the clusters sharing a correlation level higher than a predetermined correlation threshold.

19. The non-transitory computer readable medium of claim 17, the step of applying assigning all replicas of one of the user data sets to one or more of the clusters that are located within a predetermined region.

20. The non-transitory computer readable medium of claim 17, the step of applying assigning replicas of the user data sets such that a number of failover data set replicas of a first cluster is less than an additional capacity of a second clusters reserved for accommodating failover user data set replicas of the first cluster.

21. The non-transitory computer readable medium of claim 15, said computer-executed instructions, which, when executed by the computer, causing the computer to perform additional steps of:
- identifying one user data set including at least one original user data replica views from the user data sets; and
- for the at least one original user data replica view:
  - determine a new user data replica view and a moving cost for changing the original user data replica view with the determined new user data replica view; and
  - changing the original user data replica view to the determined new user data replica view if the moving cost is equal to a minimum value.

* * * * *